Figure 1:
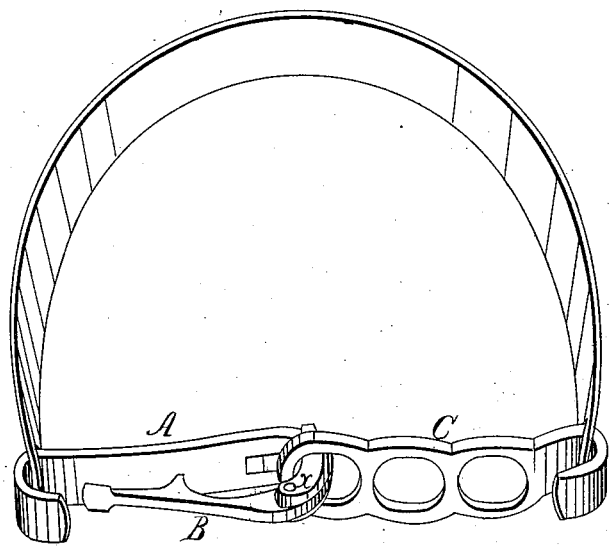
Figure 2:
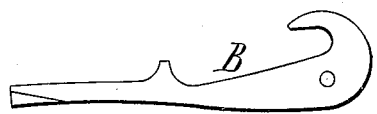

Shalters & Catern,
Hame Fastener,
No. 60,574.      Patented Dec. 18, 1866.

Witnesses.
A. A. Yeatman.
Charles Alexander.

Inventor.
M. R. Shalters.
T. Catern
per
Alexander & Mason.
Attorneys.

United States Patent Office.

IMPROVED HAME-FASTENING.

M. R. SHALTERS AND T. CATERN, OF ALLIANCE, OHIO, ASSIGNORS TO THEMSELVES, SAMUEL RAY, AND S. THOMAS.

Letters Patent No. 60,574, dated December 18, 1866.

*The Schedule referred to in these Letters Patent and making part of the same.*

TO ALL WHOM IT MAY CONCERN:

Be it known that we, M. R. SHALTERS and THOMAS CATERN, of Alliance, in the county of Stark, and State of Ohio, have invented certain new and useful improvements in Hame-Fastener and Link; and we do hereby declare that the following is a full, clear, and exact description of the same, reference being had to the accompanying drawings, and to the letters of reference marked thereon.

In the annexed drawings, making part of this specification—

A represents a metallic bar, hooked at each end. One of these hooked ends is slotted so as to receive between it a metallic hook, B. The hook B is pivoted, as shown, between the forked ends of the bar A, near the points of said forks. One end of the hook B is loose, and will either rest against the bar A or may be thrown out from it when it is desired to catch a link to be secured by it. It will be seen that when a link is caught on the hooked ends of bar A and hook B, that said link draws the loose end of said hook tightly against the bar A, and is held securely in the hooked end of bar A. C represents a metallic bar with a hook formed on one end. This bar has a series of openings cut in it which answer as links, thus making a solid or rigid link bar.

In using these devices for a hame-fastening, one end of each of the bars A and C is caught in the parts of the hame. That end of the bar A which has hook B secured to it catches into any one of the desired links of the bar C, and is there secured by means of said hook B.

Having thus fully described our invention, what we claim as new, and desire to secure by Letters Patent, is—

1. The bar A, provided with hooks, as seen, at each end, and with the hook B, secured to and operating with it as and for the purpose set forth.

2. The bar C, with links formed in it, and used in connection with the bar A, constructed as and for the purpose set forth.

As evidence that we claim the foregoing, we have hereunto set our hands in the presence of witnesses.

M. R. SHALTERS,
THOS. CATERN.

Witnesses:
P. H. BARR,
JOSEPH BARNABY.